(12) United States Patent
Huebler et al.

(10) Patent No.: US 7,273,031 B1
(45) Date of Patent: Sep. 25, 2007

(54) FUEL MIXTURE DIFFUSER TAB FOR A DIRECT-INJECTION INTERNAL COMBUSTION ENGINE

(75) Inventors: Mark S. Huebler, Shelby Township, Macomb County, MI (US); Ronald O. Grover, Ann Arbor, MI (US); Andreas M. Lippert, Rochester Hills, MI (US)

(73) Assignee: GM Global Technology Operations, Inc., Detroit, MI (US)

( * ) Notice: Subject to any disclaimer, the term of this patent is extended or adjusted under 35 U.S.C. 154(b) by 0 days.

(21) Appl. No.: 11/463,045

(22) Filed: Aug. 8, 2006

(51) Int. Cl.
*F02B 31/04* (2006.01)
(52) U.S. Cl. .................................................. 123/298
(58) Field of Classification Search ................ 123/298, 123/305, 309
See application file for complete search history.

(56) References Cited

U.S. PATENT DOCUMENTS

| | | | | |
|---|---|---|---|---|
| 4,574,754 A | * | 3/1986 | Rhoades, Jr. ............... | 123/298 |
| 4,974,565 A | * | 12/1990 | Hashimoto et al. ......... | 239/464 |
| 5,605,125 A | * | 2/1997 | Yaoita ........................ | 123/275 |
| 5,613,471 A | * | 3/1997 | Yaoita ........................ | 123/298 |
| 5,950,596 A | * | 9/1999 | Kollmann ................... | 123/298 |
| 6,003,488 A | * | 12/1999 | Roth .......................... | 123/298 |
| 6,098,589 A | * | 8/2000 | Klenk et al. ................ | 123/295 |
| 6,170,457 B1 | * | 1/2001 | Grajkowski ................ | 123/298 |

\* cited by examiner

Primary Examiner—Hai Huynh

(57) ABSTRACT

A cylinder head assembly for a direct-injection engine is provided. The cylinder head assembly includes a cylinder head at least partially defining a combustion chamber. The cylinder head is sufficiently configured to receive a fuel injector operable to inject fuel directly into the combustion chamber in a spray pattern. An ignition source, such as a spark plug, is spaced from the fuel injector and operable to initiate ignition of the fuel. A fuel mixture diffuser tab is mounted with respect to the cylinder head and extends into the combustion chamber. The fuel mixture diffuser tab is positioned between the fuel injector and the ignition source and is operable to direct a portion of the fuel toward the ignition source. An internal combustion incorporating the disclosed cylinder head assembly is also provided.

11 Claims, 1 Drawing Sheet

FUEL MIXTURE DIFFUSER TAB FOR A DIRECT-INJECTION INTERNAL COMBUSTION ENGINE

TECHNICAL FIELD

The present invention relates to a fuel mixture diffuser tab for direct injection internal combustion engines.

BACKGROUND OF THE INVENTION

A direct-injection spark-ignited internal combustion engine typically includes a fuel injector operable to inject a predetermined amount of fuel, at a predetermined time, directly into a combustion chamber. An ignition source, typically in the form of a spark plug, is provided to initiate the start of ignition or combustion of the fuel. The ratio of fuel to air near the spark plug at ignition has a large effect on combustion stability and misfires under certain engine operating conditions. With direct-injection spark-ignited engines, the fuel injection event and the ignition event may be coupled such that trade-offs must be made between the optimal fuel injection timing to enable adequate fuel and air mixing and the ignition timing required to enable optimal combustion phasing. This coupling is a result of the need to have a localized fuel and air mixture near the spark plug favorable to initiate the combustion process.

SUMMARY OF THE INVENTION

A cylinder head assembly is provided for a direct-injection engine. The cylinder head assembly includes a cylinder head at least partially defining a combustion chamber. The cylinder head is sufficiently configured to receive a fuel injector operable to inject fuel directly into the combustion chamber in a spray pattern. An ignition source, such as a spark plug, is spaced from the fuel injector and operates to initiate ignition of the fuel. A fuel mixture diffuser tab extends into the combustion chamber. The fuel mixture diffuser tab is positioned between the fuel injector and the ignition source. The fuel mixture diffuser tab is operable to direct a portion of the fuel toward the ignition source.

The fuel mixture diffuser tab extends into the combustion chamber substantially adjacent to the spray pattern and includes a first end integral with the cylinder head and a second end positioned within the combustion chamber. Preferably, the second end is contoured to approximate the shape of the spray pattern. The fuel mixture diffuser tab may be formed integrally with the cylinder head.

An internal combustion engine is also provided. The internal combustion engine includes a cylinder head at least partially defining a combustion chamber. A fuel injector is mounted with respect to the cylinder head and operates to inject fuel directly into the combustion chamber in a spray pattern. An ignition source, such as a spark plug, is mounted with respect to the head and extends into the combustion chamber and is operable to initiate combustion of the fuel. A fuel mixture diffuser tab is disposed with respect to the cylinder head and positioned between the fuel injector and the ignition source. The fuel mixture tab operates to direct a portion of the fuel toward the ignition source to enable stable combustion.

The above features and advantages and other features and advantages of the present invention will be readily apparent from the following detailed description of the best mode for carrying out the invention when taken in connection with the accompanying drawing.

DESCRIPTION OF THE PREFERRED EMBODIMENT

Figure 1:
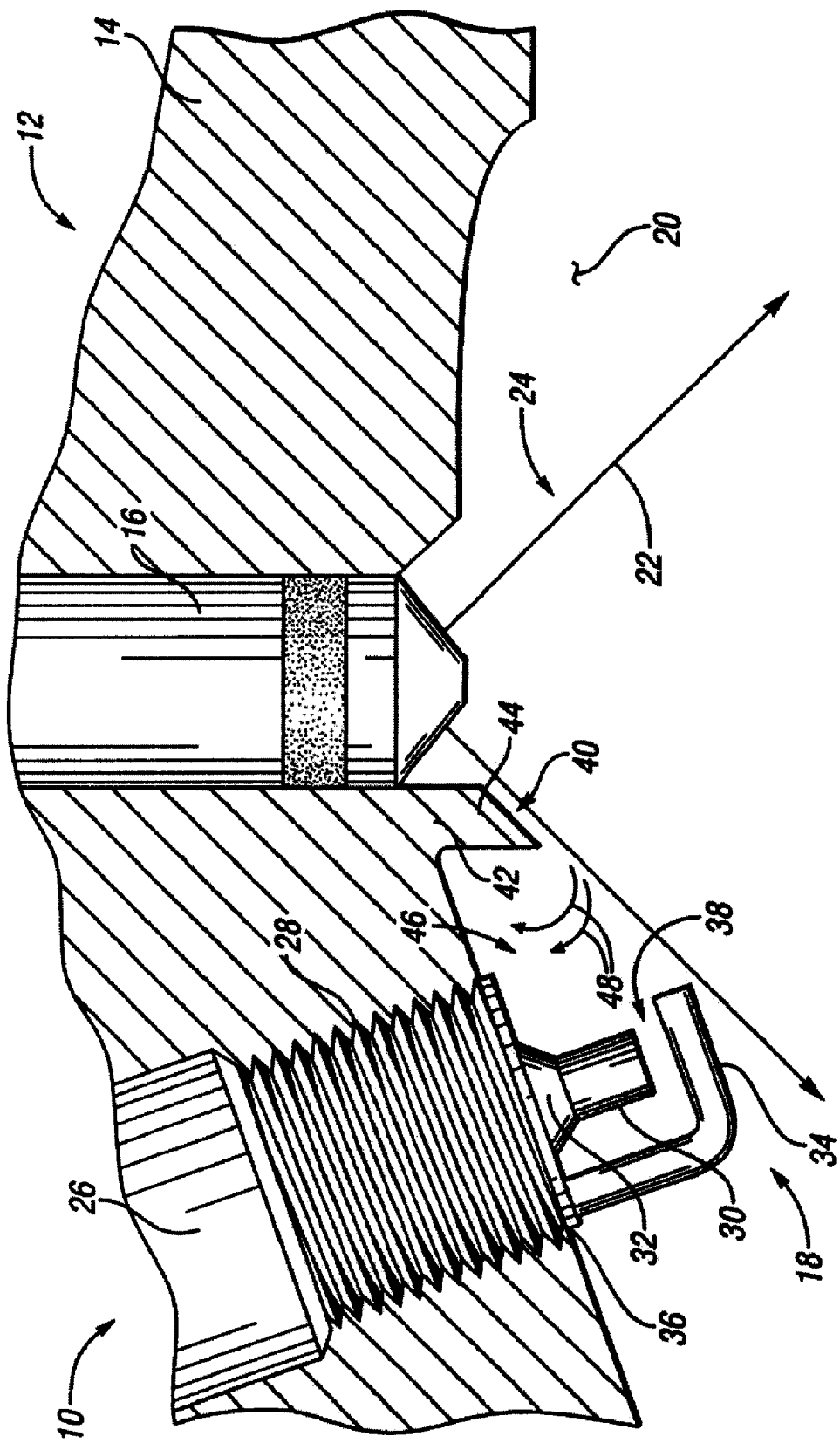
FIG. 1 is a fragmentary cross sectional schematic illustration of a portion of a direct-injection spark-ignited internal combustion engine illustrating a fuel mixture diffuser tab consistent with the present invention.

Referring to FIG. 1, there is shown a portion of an internal combustion engine generally indicated at 10. The internal combustion engine 10 is preferably a spark-ignited direct-injection engine. The internal combustion engine 10 includes a cylinder head assembly 12 including a cylinder head 14, fuel injector 16, and ignition source 18. A portion of the cylinder head 14 is shown in FIG. 1 and is preferably formed from a metal casting, such as cast aluminum or cast iron. The cylinder head 14 partially defines a combustion chamber 20. The cylinder head 14 is sufficiently configured to receive the fuel injector 16 such that a portion of the fuel injector 16 projects into the combustion chamber 20. The fuel injector 16 is operable to inject a predetermined amount of fuel 22, such as gasoline, directly into the combustion chamber 20 for combustion with air contained therein. As such, the fuel injector 16 can be characterized as a direct injection fuel injector 16. The fuel injector 16 injects fuel 22 in a spray pattern 24, such as a conical sheet spray pattern. Those skilled in the art will recognize that the present invention may be practiced with other injector spray types while remaining within the scope of that which is claimed.

The ignition source 18 is contained within the cylinder head 14 and is operable to provide a source of ignition, such as a spark, at a predetermined time to initiate the combustion of the fuel 22 contained within the combustion chamber 20. The ignition source 18 is preferably a spark plug 26, as shown in FIG. 1. The spark plug 26 is retained within the cylinder head 14 by a threaded portion 28. The spark plug 26 is shown as a "J-gap" type spark plug and includes an electrode 30 having a layer of ceramic insulation 32 and a ground electrode 34. The ground electrode 34 extends from a peripheral edge 36 of the spark plug 26 to a point spaced axially from the electrode 30 to form a gap 38. When the spark plug 26 is energized, a spark develops within the gap 38 and in turn ignites the fuel 22 contained within the combustion chamber 20. Although a "J-gap" type spark plug 26 has been described hereinabove, those skilled in the art will recognize other types of spark plugs, such as spark plugs having multiple ground electrodes, may be used while remaining within the scope of that which is claimed.

A fuel mixture diffuser tab 40 is integral with the cylinder head 14 and is positioned between the fuel injector 16 and the spark plug 26. The fuel mixture diffuser tab 40 includes a first portion 42 integral with the cylinder head 14 and a second portion 44 that extends into the combustion chamber 20. The fuel mixture diffuser tab 40 is preferably formed integrally with the cylinder head 14. However, those skilled in the art will recognize that the fuel mixture diffuser tab 40 may be formed separately and inserted into the cylinder head 14. The fuel mixture diffuser tab 40 is preferably positioned such that the spray pattern 24 of the fuel 22 is substantially adjacent to the fuel mixture diffuser tab 40 during operation of the internal combustion engine 10. Additionally, the second portion 44 of the fuel mixture diffuser tab 40 is preferably contoured to match or approximate the shape of the spray pattern 24.

In operation, as the fuel injector 16 injects fuel 22 into the combustion chamber 20, an area of low pressure 46 will develop adjacent to the side of the fuel mixture diffuser tab 40 facing the spark plug 26. Accordingly, a small amount of fuel 22 will be extracted or diverted from the spray pattern 24 into the area of low pressure 46 as indicated by arrows 48. The fuel 22 introduced to the area of low pressure 46 will operate to provide a local fuel and air mixture near the gap 38 of the spark plug 26 that is favorable to ignition. Attention should be paid to the positioning of the fuel mixture diffuser tab 40 such that the spray pattern 24 does not impinge on the fuel mixture diffuser tab 40.

By providing a portion of fuel 22 near the gap 38 of the spark plug 26 before the start of the ignition process, the repeatability and robustness of the early flame kernel development during the early stages of the combustion process is enhanced. This, in turn, improves the overall repeatability and robustness of the entire combustion process leading to smoother and consistent operation of the internal combustion engine 10. In addition, the portion of the fuel 22 extracted from the spray pattern 24 is effective in decoupling the fuel injection and ignition events of the spark-ignited direct-injection internal combustion engine 10. By decoupling the fuel injection and ignition events, the fuel injection event may be timed to yield optimal fuel and air mixture preparation, while enabling the ignition event to be timed to yield optimal combustion phasing leading to increased fuel economy and a reduction in emission constituents.

While the best modes for carrying out the invention have been described in detail, those familiar with the art to which this invention relates will recognize various alternative designs and embodiments for practicing the invention within the scope of the appended claims.

The invention claimed is:

1. A cylinder head assembly for a direct-injection engine, the cylinder head assembly comprising:
   a cylinder head at least partially defining a combustion chamber;
   wherein said cylinder head is sufficiently configured to receive a fuel injector operable to inject fuel directly into said combustion chamber in a spray pattern;
   an ignition source spaced from said fuel injector and operable to initiate ignition of said fuel;
   a fuel mixture diffuser tab extending into said combustion chamber;
   wherein said fuel mixture diffuser tab extends into said combustion chamber substantially outside and adjacent to said spray pattern such that said spray pattern does not wet said fuel mixture diffuser tab;
   wherein said fuel mixture diffuser tab is positioned between said fuel injector and said ignition source; and
   wherein said fuel mixture diffuser tab is operable to create a low pressure area to direct a portion of said fuel toward said ignition source.

2. The cylinder head of claim 1, wherein said fuel mixture diffuser tab includes a first end mounted with respect to said cylinder head and a second end positioned within said combustion chamber and wherein said second end is contoured to approximate the shape of said spray pattern.

3. The cylinder head of claim 1, wherein said ignition source is a spark plug.

4. The cylinder head of claim 1, wherein said fuel is at least partially gasoline.

5. The cylinder head of claim 1, wherein said fuel mixture diffuser tab is formed integrally with said cylinder head.

6. An internal combustion engine comprising:
   a cylinder head at least partially defining a combustion chamber;
   a fuel injector mounted with respect to said cylinder head and operable to inject fuel directly into said combustion chamber in a spray pattern;
   an ignition source mounted with respect to the head and extending into said combustion chamber, wherein said ignition source is operable to initiate combustion of said fuel;
   a fuel mixture diffuser tab positioned between said fuel injector and said ignition source;
   wherein said fuel mixture diffuser tab extends into said combustion chamber substantially outside and adjacent to said spray pattern such that said spray pattern does not wet said fuel mixture diffuser tab; and
   wherein said fuel mixture tab is operable to create a low pressure area to direct a portion of said fuel toward said ignition source.

7. The internal combustion engine of claim 6, wherein said fuel mixture diffuser tab includes a first end coextensive with said cylinder head and a second end positioned within said combustion chamber and wherein said second end is contoured to approximate the shape of said spray pattern.

8. The internal combustion engine of claim 6, wherein said ignition source is a spark plug.

9. The internal combustion engine of claim 6, wherein said fuel mixture diffuser tab is formed integrally with said cylinder head.

10. A direct-injection spark-ignited internal combustion engine comprising:
    a cylinder head at least partially defining a combustion chamber;
    a fuel injector mounted with respect to said cylinder head and operable to inject fuel directly into said combustion chamber in a spray pattern;
    a spark plug mounted with respect to the head and extending into said combustion chamber, wherein said spark plug is operable to initiate combustion of said fuel;
    a fuel mixture diffuser tab disposed between said fuel injector and said ignition source;
    wherein said fuel mixture diffuser tab extends into said combustion chamber substantially outside and adjacent to said spray pattern such that said spray pattern does not wet said fuel mixture diffuser tab;
    wherein said fuel mixture diffuser tab includes a first end coextensive with said cylinder head and a second end positioned within said combustion chamber and wherein said second end is contoured to approximate the shape of said spray pattern; and
    wherein said fuel mixture tab is operable to create a low pressure area to direct a portion of said fuel toward said spark plug.

11. The direct-injection spark-ignited internal combustion engine of claim 10, wherein said fuel mixture diffuser tab is formed integrally with said cylinder head.

* * * * *